United States Patent [19]
Etoh

[11] Patent Number: 5,859,932
[45] Date of Patent: Jan. 12, 1999

[54] VECTOR QUANTIZATION CODING APPARATUS AND DECODING APPARATUS

[75] Inventor: Minoru Etoh, Katano, Japan

[73] Assignee: Matsushita Electric Industrial Co. Ltd., Osaka-fu, Japan

[21] Appl. No.: 997,701

[22] Filed: Dec. 23, 1997

Related U.S. Application Data

[63] Continuation of Ser. No. 425,507, Apr. 20, 1995, abandoned.

[30] Foreign Application Priority Data

Apr. 20, 1994 [JP] Japan .............................. HEI-6-081534

[51] Int. Cl.$^6$ ........................................................ G06K 9/36
[52] U.S. Cl. ........................................... 382/253; 382/233
[58] Field of Search ...................................... 382/233, 234, 382/253, 251; 348/414, 417, 422, 418

[56] References Cited

U.S. PATENT DOCUMENTS

| | | | |
|---|---|---|---|
| 4,958,225 | 9/1990 | Bi et al. .................................... | 348/422 |
| 4,965,580 | 10/1990 | Tasaki et al. ............................. | 348/418 |
| 5,177,797 | 1/1993 | Takenaka ................................. | 382/234 |
| 5,185,819 | 2/1993 | Ng ............................................ | 382/233 |
| 5,195,137 | 3/1993 | Swaminathan .......................... | 395/2.31 |
| 5,341,441 | 8/1994 | Maeda et al. ............................ | 358/539 |
| 5,398,069 | 3/1995 | Huang et al. ............................ | 348/418 |
| 5,454,051 | 9/1995 | Smith ....................................... | 382/233 |
| 5,506,801 | 4/1996 | Tanel ....................................... | 364/807 |
| 5,533,138 | 7/1996 | Kim et al. ................................ | 348/422 |
| 5,537,440 | 7/1996 | Eyuboglu ................................ | 348/448 |
| 5,608,841 | 3/1997 | Tsuboka ................................. | 395/2.65 |

OTHER PUBLICATIONS

T. Murakami, "Image High Efficiency Coding by Vector Quantization (1985)", pp. 1–9.

ISO–IEC/JTC1/SC29/WG11,MPEG Test Model, MPEG 93/457 (1993), pp. 1–30.

Yoseph Linde, et al., An Algorithm for Vector Quantizer Design, *IEEE Transactions of Communications*, vol. Com–28, No. 1, Jan. 1980, pp. 84–95.

Nuno Miguel Borges, Library–based Image Coding Using Vector Quantization of the Prediction Space, *Massachusetts Institute of Technology*, Sep. 1993, pp. 1–127.

John W. Woods, et al., Subband Coding of Images, *IEEE Transactions on Acoustics, Speech, and Signal Processing*, vol. ASSP–34, No. 5, Oct. 1986, pp. 1278–1289.

David A. Huffman, A Method for the Construction of Minimum–Redundancy Codes, *Proceedings of the I.R.E.*, pp. 1098–1101.

*Primary Examiner*—Yon J. Couso
*Attorney, Agent, or Firm*—Beveridge, DeGrandi, Weilacher & Young, L.L.P.

[57] ABSTRACT

To transmit and record an input pattern efficiently by dividing the input pattern into a vector quantization index and its difference signal, and sequentially optimize the vector quantization code book. A least distortion vector determining unit 101 issues a representative vector $y_m$ having least square error in $y_i$ in the code book, with respect to an inputted 64-dimensional vector x, and simultaneously issues its index m, and the difference vector d obtained as $d=x-y_m$ in a subtractor 103 is quantized in a quantizing unit 104, and is issued together with the index data. Afterwards, a difference vector d' is determined in an inverse quantizing unit 106, and a code book changing unit 107 changes so that the representative vector $Y_m$ may be closer to the input vector x by using this difference vector. At the decoding side, synchronously, the representative vector $y_m$ is changed.

11 Claims, 8 Drawing Sheets

VECTOR QUANTIZATION CODING APPARATUS AND DECODING APPARATUS

This is a continuation application of application Ser. No. 08/425,507 filed on Apr. 20, 1995, now abandoned, which application is hereby incorporated by reference.

BACKGROUND OF THE INVENTION

1. Industrial Field of Utilization

The present invention relates to a pattern recording and transmitting apparatus using vector quantization coding for transmitting and recording, by replacing input patterns with index information of similar patterns, and more particularly to a vector quantization coding apparatus for transmitting and accumulating images by a small code quantity, and a decoding apparatus.

2. Related Art

Vector quantization is a technology for coding the pattern to be transmitted by high efficiency, by replacing the pattern information with representative vectors contained in a code book, and transmitting by coding the index. Already in the field of picture transmission, as disclosed by Murakami in "Image high efficiency coding by vector quantization," in Technical Report of Electronic Information Communication Society, IT85-61 (December 1985), the prototypes of vector quantization coding apparatus and decoding apparatus for television conferencing on the basis of this technology have been developed. As one of the problems of coding apparatus and decoding apparatus on the basis of vector quantization, it has been hitherto indicated that the performance largely depends on the design of representative vectors contained in the code book. To solve this problem, Linde et al. developed an algorithm called LBG after the initials of the researchers (Y. Linde, A. Buzo, and R. B. Gray: "An Algorithm for Vector Quantizer Design," IEEE Transaction on Communication, Vol. COM-28, No. 1, pp. 84–95, January 1980). In the LBG algorithm, the prior obtained learning system is used as the index, and starting from a proper initial code book, the dividing condition and representative condition are repeatedly applied in the learning system. In the meaning as, for example, least square error for the learning system, a semi-optimal representative vector can be obtained.

In the vector quantizer using the code book obtained by this algorithm, a favorable performance is obtained when the input pattern has the same statistic nature as the learning system used in design, but when the statistic nature is different, satisfactory coding characteristic cannot be obtained. It is hence attempted to update the code book so as to be applicable to an input system having a different statistical nature.

As the conventional vector quantization coding apparatus and decoding apparatus having such measures, the vector quantization coding transmission apparatus disclosed in the Japanese Laid-open Patent No. 2-145078 is known. This is called the first prior art. For dynamic learning of the code book corresponding to changes of the input system, in the first prior art, if there is an input vector producing a large error, the representative vectors in the code book are selectively rewritten. This is explained in FIG. 7.

In a code book 702 suppose a code book composed of N representative vectors is stored. Herein, $y_1, y_2, \ldots, y_N$ are K-dimensional vectors. A vector quantization coding unit 701 receives a k-dimensional input vector x, and sends out index(x) expressed in formula 1 below as an index in FIG. 7.

$$\text{index}(x) = \underset{i}{\arg\min} \ |y_i - x|^2, i = 1, 2, \ldots, N \qquad (1)$$

That is, the index of representative vector minimum in square error is provided. At the same time, the least square error at this time is dist(x) shown in formula 2. In FIG. 7 dist(x) is indicated as dist.

$$\text{dist}(x) = \underset{i}{\min} \ |y_i - x|^2, i = 1, 2, \ldots, N \qquad (2)$$

A coding control unit 703 holds the selection frequency of representative vectors up to the present. The action differs with the value of dist(x). When dist(x) is smaller than a specific threshold Td, the selection frequency of index(x) is increased by 1, and the process distinguishing code for not updating the representative vector and the transmission index of representative vector are sent to a decoding control unit 704. When dist(x) is larger than the specific threshold Td, the index of minimum selection frequency up to the present (IDL in FIG. 7), the process distinguishing code for updating the representative vector, and the input vector x are transmitted. Consequently, the representative vector of the index of the minimum selection frequency of the code book 702 is erased, and instead the representative vector having the input vector x as selection frequency 1 is obtained ($y_n$ in the diagram).

In the decoding control unit 704, when the process distinguishing code indicates that the representative vector is not updated, index(x) is sent into a vector quantization decoding unit 705, and the vector quantization decoding unit 705 reads out the representative vector $y_m$ (m=index(x)) with its index(x) as the index, from a code book 706, and returns it to the decoding control unit 704. In the decoding control unit 704, it is outputted as x' in FIG. 7.

When the process distinguishing code to the decoding control unit 704 shows that the representative vector is updated, the code book is rewritten the same as at the coding side. At this time, the output x' of the decoding control unit 704 is the same as vector x. Sequentially, thus, vectors producing large errors are entered, the code books at the coding side and decoding side are matched, and the representative vectors of small selection frequency are rewritten, and therefore if the statistic nature of the input vector system is changed, it is expected that the coding performance will not deteriorate significantly.

On the other hand, instead of transmitting images by using vector quantization coding alone, other technology is also known to utilize the vector quantization in generation of prediction image and transmit or record the difference image of the prediction image and input image by using transform coding. An apparatus using the technology corresponding to this is disclosed by Nuno Miguel Borges de Pinho Cruz de Vasconcelos in "Library-based Image Coding Using Vector Quantization of the Prediction Space," MIT Master Thesis, September, 1993. This is called the second prior art.

The constitution of the second prior art is shown in FIG. 8. In the original text, the term library is used, but it is the same as code book, and hence the expression is changed to code book in the diagram. In the second prior art, it is a feature that vector quantization is added to the inter-frame prediction portion of conventional motion compensation digital cosine transform coding. Hereinafter, the digital cosine transform and its inverse transform are abbreviated as DCT, IDCT, respectively. In the diagram, operations of subtractor 805, motion compensation unit 806, motion estimating unit 807, DCT operation unit 808, quantizing unit 809, inverse quantizing unit 810, IDCT operation unit 811, and multiplexer 812 are exactly same as operations of the image coding system (MPEG2) cited in ISO-IEC/JTC1/SC29/WG11, MPEG Test Model, MPEG93/457 (1993), and hence detailed descriptions are omitted.

When a changeover switch 804 acts to select the output of the motion compensating unit 806, the coding apparatus in FIG. 8 processes same as the MPEG2 coding apparatus. In MPEG2, the motion is predicted in order to enhance the coding efficiency, and correspondence to the decoding result of the preceding frame is obtained (motion compensation), and the difference of motion compensated images is operated by DCT in a block of 8×8 pixels, and hence the image is coded.

In the second prior art, in addition to this MPEG2 processing, vector quantization is performed on the array of pixel values for composing the DCT block as, 64-dimensional vector. In the vector quantizing unit 803, 64-dimensional representative vectors are stored, and the index of the representative vector with least distortion to the input vector is outputted. When the least distortion at this time is smaller than the prediction error obtained from the motion compensating unit 806, the switch 804 is connected to the vector quantizing unit 803, the representative vector is put into the subtractor 805, and the difference is vector-quantized.

At the same time, the index of the representative vector is outputted to the multiplexer 812. The multiplexer 812 multiplexes inputs, and produces the output of the coding apparatus. The representative vector is produced in a code book designing unit 801 by using the LBG algorithm for the input vector of the past several frames in every frame. In this prior art, it is necessary to update the code book in the vector quantizing unit 803 in every frame, the code book updating unit 802 updates the code book in one of the following methods.

Method 1. Selective updating of code book: When the quantizing error when the code book used in the previous frame is applied in the present frame without change is within a specific threshold, the code book is not updated, and when exceeding the threshold, the representative vector in the code book is transmitted to the decoding side to be updated. As a result, when the change of the input vector system is small, it is not necessary to transmit the code book updating information.

Method 2. Updating of code book by difference information: Between the code book of the preceding frame and the code book newly determined in the present frame, the representative vector is determined so that the difference vector may be a minimum norm, and the difference vector is transmitted together with the corresponding relation. As a result, the updating information is compressed.

In this way, while suppressing the increase of redundant coding quantity due to code book updating, the block patterns entered in the past are stored by code book updating in addition to the inter-frame prediction by motion compensation, and by reproducing by vector quantization, for example, even when a concealed region re-appears, a favorable picture quality is obtained.

The prior arts had, however, the following problems.

Problem (1) Updating of code book: In the first prior art, if the input vector system contained many independent vectors not forming a group (having "off" values), the representative vector is updated every time an independent vector is entered, and the updating information occupies much of the code quantity, and the coding efficiency is lowered. Or when an independent vector is directly used as a representative vector, the optimality of the code book may be spoiled. In the second prior art, since the LBG algorithm is applied in every frame for updating the code book, it is free from the problem of optimality related to the first prior art, but the quantity of processing is colossal. Or, even by using the code book updating technique of the second prior art, updating of the entire code book is necessary, and lowering of coding efficiency is inevitable.

Problem (2) Composition of the code book: The second prior art is a mixed system of using vector quantization in generation of predictive image and using DCT in predictive error coding. At this time, the code book is composed by using the input vectors obtained from the entire picture in the learning system. That is, the code book is designed for the block pattern of the entire image. Therefore, in generation of the predictive image by vector quantization, for example, in order to have an effective of background a prediction, a code book having many representative vectors is created, and it is necessary to search the representative vector with least distortion at the time of vector quantization. It requires processing of a very heavy design load.

Problem (3) Block distortion: In vector quantization and DCT in the second prior art, the processing unit is a block having an image divided into rectangular sections, and in a limited coding quantity, the quantizing error of DC component in each block is sensed as block boundary, which disturbs visually. As transform coding not to detect block boundary, for example, sub-band coding is proposed by J. W. Woods and S. D. O'Neil in "Subband Coding of Images," IEEE Transaction on Acoustics Speech and Signal Processing, Vol. ASSP-34, No. 5, pp. 1278–1288 (October 1988).

In sub-band coding, the image is divided into different frequency bands by filter scanning. In this sub-band coding, since the image frequency components are not closed in block unlike discrete cosine transform, and the quantizing error of low frequency components are not sensed as a block boundary to cause visual disturbance. In FIG. 8, when the DCT operating unit 808 is replaced by the processing unit for sub-band decomposition operation, and the IDCT operating unit 811 by the processing unit for sub-band composition, sub-band coding is realized. However, when the DCT operating unit 808 is used as the processing unit for sub-band decomposition operation, since the predictive image coming in from the changeover switch 804 is a block unit, if different patterns are predicted in adjacent blocks, discontinuity occurs in the block boundary portion of the predictive image, and it must be coded in sub-band. In DCT coding, since the transform processing is closed within the block, discontinuity occurring in the block boundary of predictive image does not matter, but in sub-band coding, since the processing is not closed in block, the coding efficiency is lowered.

SUMMARY OF THE INVENTION

It is hence a primary object of the invention to present a vector quantization coding apparatus and a decoding apparatus solving the above three problems.

The vector quantization coding apparatus according to a first aspect of the invention to solve the problem (1) comprises a code book for recording representative vectors, means for determining a representative vector with the least distortion from an input vector and the code book and outputting corresponding index data, means for determining the difference vector between the selected representative vector and input vector, means for coding the difference vector, and means for changing the representative vector so that the norm of the difference vector and the input vector may be smaller, by using directly the difference vector when the difference vector coding is reversible processing after the representative vector with minimum distortion is selected, or using the difference vector after decoding process to be done at the decoding side when the difference vector coding is irreversible process, wherein the index data and the coded difference vector are outputted.

Similarly, the decoding apparatus comprises means for receiving index data of representative vectors and coded difference vector, and recording the representative vectors, means for decoding the coded difference vector, and means for changing the representative vector so that the norm of the difference vector may be smaller, by using directly the difference vector when the difference vector coding is reversible processing after the representative vector is read out, or using the decoded difference vector when the difference vector coding is an irreversible process, wherein the sum of the decoded difference vector and the read-out representative vector is outputted as an output vector.

The vector quantization coding apparatus according to a second aspect of the invention for solving the problem (2) comprises plural code books for receiving the luminance information at adjacent positions in an image as input vector, and recording representative vectors corresponding to the positions in the image of the input vector, means for selecting one or more code books corresponding to the position in the image of the input vectors from the plural code books, means for determining the representative vector with least distortion from the input vector and the selected code book, and producing corresponding index data, means for determining the difference vector between the selected representative vector and the input vector, and means for coding the difference vector, wherein the index data and coded difference vector are outputted.

The decoding apparatus similarly comprises plural code books for receiving the index data of representative vectors and coded difference vector, and recording the representative vectors corresponding to the positions in the image of the input vector, means for selecting one or more code books corresponding to the position in the image of the input data from the plural second code books, and means for decoding the coded difference vector, wherein the sum of the decoded difference vector and the read-out representative vector is outputted as an output vector.

The vector quantization coding apparatus according to a third aspect of the invention for solving the problem (3) comprises means for composing an input vector duplicating images between adjacent blocks, using pixels at adjacent positions in an image as a block, code book for recording a representative vector of duplicated input vector, and means for selecting the representative vector with least distortion from the input vector and the code book, and producing corresponding index data, wherein the index data of the selected representative vector is coded and outputted.

Similarly, the decoding apparatus comprises a code book for receiving pixels at adjacent positions in an image as a block, and recording the representative vector of the input vector of duplicated images between adjacent blocks, and means for reading out the representative vector corresponding to the index data of the obtained representative vector, and overlapping the duplicate blocks, thereby predicting the input image.

In the specified constitution of the vector quantization coding apparatus in the first aspect of the invention, the representative vector with least distortion, to the input vector, is selected from the code book. The means for determining the difference vector determine the difference vector between the representative vector with least distortion and the input vector, and this difference vector is coded by the means for coding the difference vector, and the index data of a representative vector is outputted In the decoding apparatus, by receiving the above input, the difference vector is determined by the means for decoding the difference vector. On the other hand, from the same code book as in the coding apparatus, the representative vector is determined on the basis of the index data of the transmitted representative vector, and the input vector is determined as the sum of the difference vector and representative vector.

In the vector quantization coding apparatus, when the difference vector coding is reversible process, the difference vector is directly used, and when the difference vector coding is irreversible process, the difference vector decoded at the decoding side is used, and the selected representative vector is changed so as to decrease the difference vector of the representative vector and input vector. As a result, the representative vector is closer to the input vector.

To keep matching of the code book, in the decoding apparatus, too, the decoded difference vector is determined by the means for decoding the difference vector, and the representative vector is changed so as to be closer to the input vector.

In addition to the index data of a quantizing vector, the difference vector from the input vector is coded and sent, and the code book is always changed by the difference vector, so that transmission of input vector and optimization of the code book are done simultaneously.

In the second aspect of the invention, pixels at adjacent positions in an image form a block, and the array of luminance values in this block is an input vector, and vector quantization coding and its decoding are done. Plural code books are prepared depending on the position in the image. Depending on the position of the block to be coded, the code book in which the representative vector is searched or read is changed over.

In the vector quantization coding apparatus, the representative vector with least distortion is selected from the changed code book, and the difference vector of the representative vector and input vector is determined by the means for determining the difference vector. The difference vector is coded by the means for coding the difference vector, and is outputted together with the index data of the representative vector.

In the decoding apparatus, synchronizing with the coding apparatus, the code book is changed over depending on the decoding position. The coded difference vector is decoded, and the sum with the representative vector obtained from the index data is outputted. The representative vector in the code book is used for generating a predictive image, and the difference image from the input image is separately coded as a difference vector. The code book is changed over depending on the position in the image, and the code book expresses only a local pattern, and hence the number of representative vectors necessary for coding is decreased.

In the vector quantization coding apparatus according to the third aspect of the invention, pixels at adjacent positions in an image form a block, and an input vector is composed by duplicating pixels between adjacent blocks. The code book is composed of the pixel patterns of duplicated blocks. The vector quantization coding apparatus determines the representative vector with the least distortion relating to the overlapped input vectors, and sends out the index data.

Receiving it, at the decoding apparatus, the representative vector is read out from the code book. The representative vector, same as in the vector quantization coding apparatus, expresses the luminance pattern of the overlapping block sharing the pixels between adjacent blocks. By duplicating it on the image by the means for predicting the input image, an image not clear in discontinuity of the block boundary is generated.

BRIEF DESCRIPTION OF THE DRAWINGS

FIG. 5 (*b*) is a diagram showing an example of overlapped input vector composition in the third embodiment.

Figure 1:
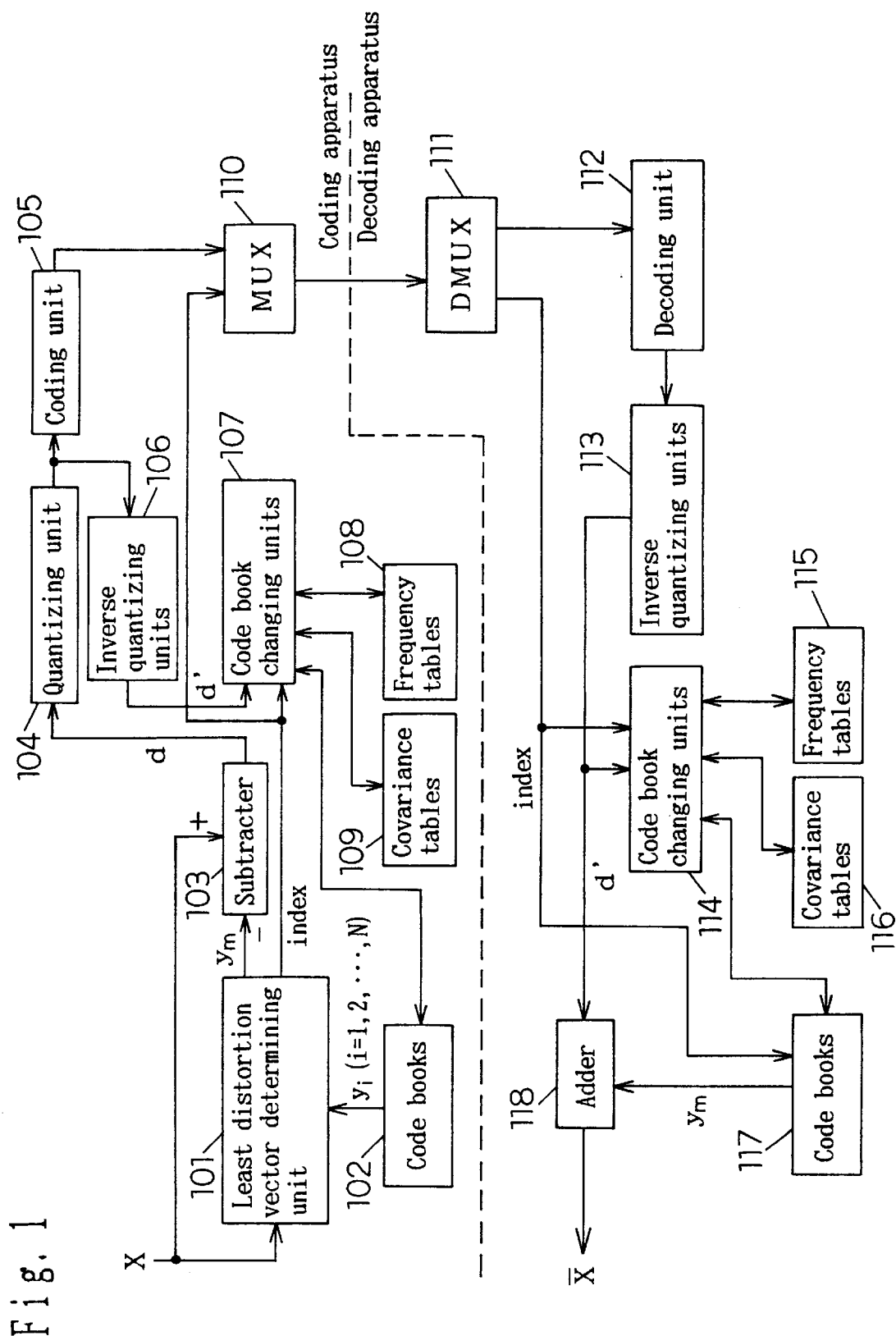
FIG. 1 is a block diagram of vector quantization coding apparatus and decoding apparatus in a first embodiment of the invention.

| [Reference Numerals]) | |
|---|---|
| 101 | Least distortion vector determining unit |
| 102, 117 | Code books |
| 103 | Subtracter |
| 104 | Quantizing unit |
| 105 | Coding unit |
| 106, 113 | Inverse quantizing units |
| 107, 114 | Code book changing units |
| 108, 115 | Frequency tables |
| 109, 116 | Covariance table |
| 110 | Multiplexer (mixer) |
| 111 | Demultiplexer (divider) |
| 112 | Decoding unit |
| 118 | Adder |
| 201 | Least distortion vector determining unit |
| 202, 221 | Code books |
| 203, 223 | Code book changeover units |
| 204 | Subtracter |
| 205, 218 | Code book changing units |
| 206, 219 | Frequency tables |
| 207, 220 | Covariance table |
| 208 | DCT operating unit |
| 209 | Quantizing unit |
| 210 | Variable length coding unit |
| 211 | Multiplexer (mixer) |
| 212, 216 | Inverse quantizing units |
| 213, 217 | IDCT operating unit |
| 214 | Demultiplexer (divider) |
| 215 | Variable length decoding unit |
| 222 | Adder |
| 224 | Learning vector quantizing unit (LVQ) |
| 225 | Learning inverse vector quantizing unit (LIVQ) |
| 301 | Input image memory |
| 302, 313, 323 | Overlapped vector generating units |
| 303, 325 | Predictive image generating units |
| 304, 326 | Predictive image memories |
| 305, 324 | Index store memories |
| 306 | Subtracter |
| 307 | Sub-band decomposition unit |
| 308 | Quantizing unit |
| 309, 320 | Coefficient memories |
| 310 | Variable length decoding unit |
| 311, 319 | Inverse quantizing units |
| 312, 321 | Sub-band composition unit |
| 314, 322 | Difference image memories |
| 315 | Learning vector quantizing unit (LVQ) |
| 316 | Multiplexer (mixer) |
| 317 | Demultiplexer (divider) |
| 318 | Variable length decoding unit |
| 327 | Adder |

PREFERRED EMBODIMENTS

Referring now to the drawings, embodiments of the invention are described in detail below. In the first to third embodiments herein, for the ease of understanding of operation of the apparatus in each embodiment, the processing image is moving picture data, one frame is composed of 144×176 pixels, and the input vector is supposed to be composed of 8 vertical pixels and 8 horizontal pixels (in the third embodiment, however, using overlapped blocks, it is composed of 10 vertical pixels and 10 horizontal pixels). The number of blocks, or the number of input vectors is 18×22, and the dimensions are 64 (100 in the third embodiment).

FIG. 1 is a block diagram of a vector quantization encoding apparatus and decoding apparatus in the first embodiment of the invention, in which the vector quantization coding apparatus is composed of blocks 101 to 110, and the decoding apparatus is composed of blocks 111 to 118. Herein, the code books 102, 117, code book changing parts 107, 114, frequency tables 108, 115, covariance tables 109, 116, and inverse quantizing units 106, 113 are identical in constitution and operate the same. This is intended to keep consistency between the coding side and the decoding side.

The number N of the representative vectors y in the code book is 100 (N=100). The least distortion vector determining unit 101 receives a 64-dimensional vector x, and produces $y_m$ as the least square error among $y_i$ in the code book (i=1, 2, . . . , N). At the same time, the index data m is outputted as an index. A subtracter 103 determines the difference vector d as $d=x-y_m$. The difference vector d is calculated in the quantizing unit 104 in formula 3, and is determined as a quantized difference vector e. In formula 3, K=100, and $d_i$ and $e_i$ are i-th elements of 64-dimensional vectors d and e. In formula 3, incidentally, q is a quantizing step, and the value is determined depending on the coding bit-rate.

$$e_i = \frac{d_i}{q}, i = 1, 2, \ldots, K \quad (3)$$

The quantized difference vector e is Huffman-coded, and is sent out to the decoding apparatus side from the multiplexer 110. Huffman coding is a technology disclosed by D. A. Huffman in "A Method for the Construction of Minimum Redundancy Codes," Proc. IRE, Vol. 40, No. 10, pp. 1098–1101.

In Huffman coding, since the code length is assigned depending on the onset probability of symbols, and hence efficient coding is realized. In this embodiment, in particular, by roughly quantizing the difference vector d in the quantizing unit 104, the quantized difference vector e is concentrated around zero vector, and coding quantity can be suppressed. The Huffman code of the transmitted and quantized difference vector e is decoded in the decoding unit 112, and is transformed into a difference vector d' in the inverse quantizing unit 113 by calculation according to formula 4. In formula 4, d'$_i$ is the i-th element of vector d'. Incidentally, passing through the process of quantizing and inverse quantizing, it is generally d≠d'.

$$d'_i = q(2e_i+1)/2 \text{ in the case of } e_i \geq 0 (i=1,2,\ldots,K)$$

$$d'_i = q(2e_i-1)/2 \text{ in the case of } e_i < 0 (i=1,2,\ldots,K) \quad (4)$$

On the other hand, the index data 'index' of least distortion vector $y_m$ is also sent out to the decoding side through the multiplexer 110. At the decoding side, the index data and Huffman code of difference vector are separated in a demultiplexer 111, and the index data 'index' is sent into a code book 117. As a result, $y_m$ is sent out from the code book 117. The decoded input vector x is reproduced as x'=$y_m$ +d' in an adder 118, and it becomes the output of the decoding apparatus.

The code book updating process in the first embodiment is described. Corresponding to the code book $y_i$ (i=1, 2, . . . , N), frequency $h_i$ (i=1, 2, . . . , N), and covariance $\Sigma_i$ (i=1, 2, . . . , N) are respectively stored in frequency tables 108, 115 and covariance tables 109, 116. At the coding side, the least distortion vector $y_m$ and its index are outputted from the least distortion vector determining unit 101, and at the decoding side, the least distortion vector $y_m$ is read out from the code book, and the code book changing means 107, 114 will operate as follows. The input comprises the index data of the least distortion vector and the inversely quantized difference vector d'.

Learning step 1: From the code book, covariance table, and frequency table, the representative vector $y_i$, its covariance $\Sigma_i$, and frequency $h_i$ (i=1, 2, . . . , N) are read out.

Learning step 2: From the index data 'index', the least distortion representative vector $y_m$ is changed in formula 5, and covariance $\Sigma_m$ in formula 6. Others, $y_i$ and $\Sigma_i$ (i=1, 2, . . . , N, however, i≠m) are left intact. In formulas 5 and 6, k denotes an input step for an increment of 1 at every input vector, $d^t$ denotes transpose of vector d, and γ is a learning coefficient, which is determined experimentally.

$$y_i^{(k+1)} = y_i^{(k)}, i \neq m \wedge i \in 1,2,\ldots,N$$

$$y_m^{(k+1)} = y_m^{(k)} + \gamma d', 0.0 \leq \gamma < 1.0 \quad (5)$$

$$\Sigma_i^{(k+1)} = \Sigma_i^{(k)}, i \neq m \wedge i \in 1,2,\ldots,N$$

$$\Sigma_m^{(k+1)} = (1-\gamma)\Sigma_m^{(k)} + \gamma d'd'^t, 0.0 \leq \gamma < 1.0 \quad (6)$$

Learning step 3: The frequency $h_m$ is increased by 1, and other frequencies $h_i$ (i=1, 2, . . . , N, however, i≠m) are invariable.

The process so far is done in four frames, that is, in a total of 1584 input vectors (22×18×4 frames). In every four frames, the representative vector splitting process is done. This is described below.

Splitting step 1: Frequencies $h_i$ (i=1, 2, . . . , N) are arranged in ascending order, and the representative vector beneath the threshold Th, and its frequency and covariance are erased. The number of erased representative vectors is supposed to be Ne. The number of input vectors in four frames is 1584, and the number of representative vectors is N=100, and hence the average of $h_i$ is about 158. The value of Th is set smaller than that, for example, about 5.

Splitting step 2: The representative vectors that are not erased are arranged in the descending order of matrix formula of covariance $\Sigma_i$ (i=1, 2, . . . , N). Among them, the representative vectors over threshold TΣ are split into Ne pieces of the superior position. Supposing the index of the vectors to be divided to be k, and the index of the erased vector to be 1, the splitting rules are expressed in formulas 7 and 8. Herein $p_k$ is the principal component vector of $\Sigma_k$, and ε is an experimentally determined constant.

$$y_k = y_k + \epsilon P_k$$

$$y_n = y_n - \epsilon P_k \quad (7)$$

$$\Sigma_k = \Sigma_k$$

$$\Sigma_n = \Sigma_k \quad (8)$$

Splitting step 3: All frequencies $h_i$ (i=1, 2, . . . , N) are set newly to zero.

In this embodiment, by this splitting process, the representative vectors low in selection frequency are erased in every four frames, and representative vectors of large covariance, that is, large in error to input vectors are split. This splitting is done by synchronizing between the coding side and decoding side while keeping consistency of the code books, only by transmitting difference vector information. Therefore, in the condition of sending the result of vector quantization and difference information, the code book can be updated without sending particularly code book updating information. The code book updating does not depend on the conventional LBG algorithm, and is done by sequential optimization of bringing the representative vector of least distortion closer to the input vector, and processing is simple. Besides, by always estimating the covariance matrix, it is characteristic that the vectors of large vector quantization error can be split.

In the embodiment, each component of difference vector is subjected to scalar quantization, but it may be also constituted to process the difference vector itself again by vector quantization in order to enhance the coding efficiency. In addition, the vector quantization index is directly coded as equal length code, but Huffman coding is also possible by using a frequency table. In particular, since the size of a code book is 100, the effect of improvement of coding efficiency seems to be particularly notable.

Figure 2:
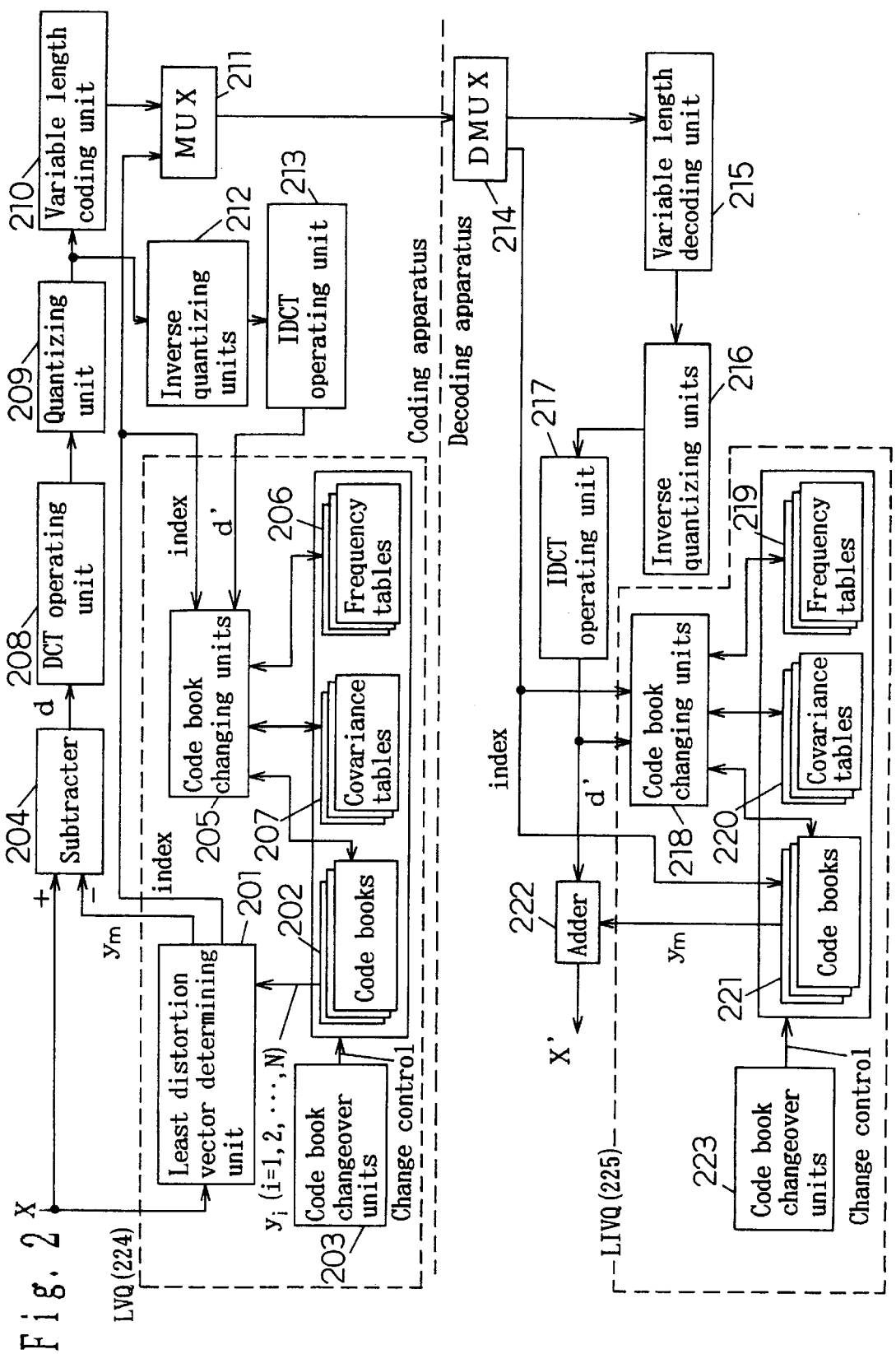
FIG. 2 is a block diagram of vector quantization coding apparatus and decoding apparatus in a second embodiment of the invention.
Figure 4:
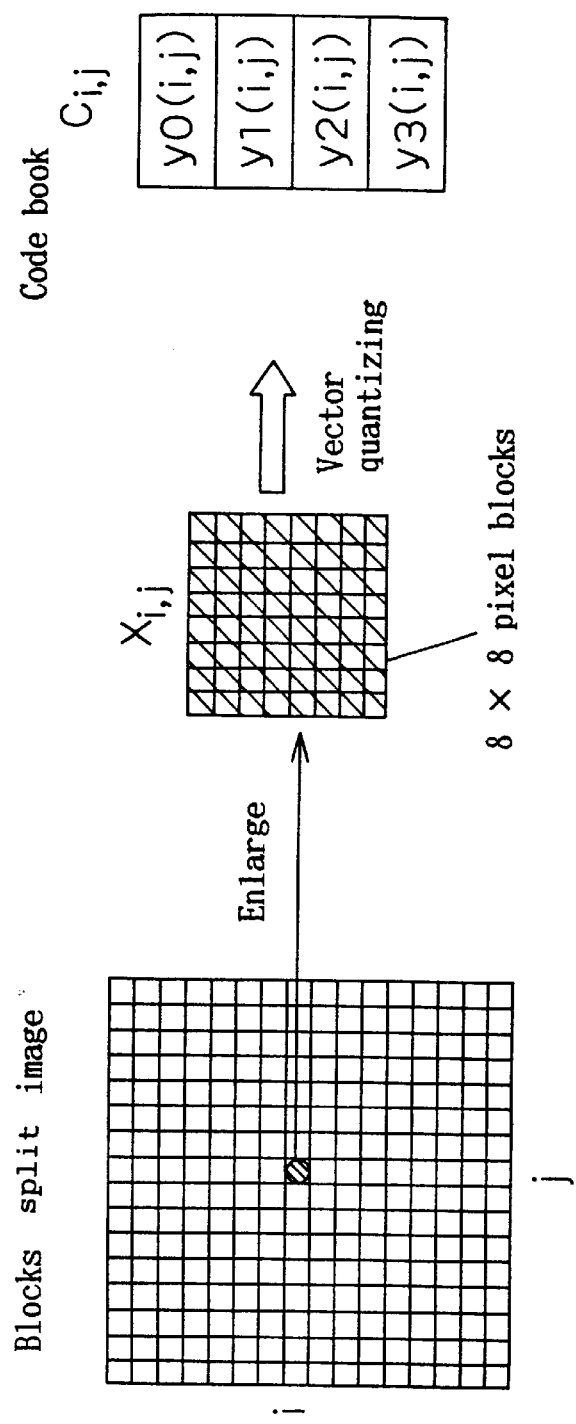
FIG. 4 is a diagram showing the composition of an input vector and code book in the second embodiment.

Referring now to FIGS. 2 and 4, the second embodiment of the invention is described below. In the second embodiment, the composition of code book and coding method of a difference vector are different from the first embodiment.

As shown in FIG. 4, one code book is prepared for each one of the blocks having an image divided into 18×22 sections. Suppose $C_{i,j}$ (i=1, 2, . . . 18, j=1, 2, . . . 22). Therefore, the number of code books is 396. Elements of each $C_{i,j}$ are 4 representative vectors.

In FIG. 2, the code book changeover parts 203, 223 select $C_{i,j}$ to be processed according to the block position (i, j) of the input vector $x_{i,j}$. As a result, in the least distortion vector determining unit 201, the representative vector having least distortion only for input vector $x_{i,j}$ is selected from $C_{i,j}$ of the code book 202, and the vector $y_m$(i, j) and index data are outputted. In the subtractor 204, same as in the first embodiment, a different vector is calculated as $d_{i,j} = x_{i,j} - y_m(i, j)$.

The obtained difference vector is put out through DCT operating unit 208, quantizing unit 209, variable length coding unit 210, and multiplexer 211. The difference vector expresses a vector quantization error signal of 8×8 blocks, and the DCT operation is two-dimensional. In this embodiment, the above processing is achieved by using the DCT operating unit, quantizing unit, and variable length coding unit of inter-frame mode disclosed in CCITT Recommendation H.261. The inverse processing realized by variable length coding unit 215, inverse quantizing units 212, 216, and IDCT operating units 213, 217 is also the same process of inter-frame mode disclosed in CCITT Recommendation H.261.

At the decoding side, a difference vector $d'_{i,j}$ decoded through the IDCT operating unit 217 is obtained, and is sent to an adder 222. On the other hand, the index data 'index' obtained in the least distortion vector determining unit 201 is sent into the code book 221 through multiplexer 211 and demultiplexer 214, and the representative vector $y_m(i, j)$ is outputted from the code book 221, and in the adder 222, the output of the decoding apparatus is calculated as $$x_{i,j}=y_m(i, j)+d'_{i,j}.$$

Explained below is the updating process of the code book in the second embodiment. This is the same processing as the learning step shown in the first embodiment. However, the code books, covariance tables, and frequency tables are changed over by the block position (i, j). Besides, due to the difference in composition of the code book, the splitting process of representative vector varies. In the following learning step, the representative vector $y_m$ expresses the representative vector of code book $C_{i,j}$. It is the same with frequency and covariance, too.

Learning step 1: From the code book, covariance table and frequency table changed over by the code book changeover unit (201 or 223), the representative vector $y_i$, its covariance $\Sigma_i$, and frequency $h_i$ (i=1,2,3,4) are read out.

Learning step 2: When the square norm of difference vector $d'_{i,j}$ is less than threshold Td, the operation advances to step 3. If the square norm of difference vector $d'_{i,j}$ is over threshold Td, the representative vector $y_n$ of least frequency is rewritten as $y_n=y_m+d'$ by using least distortion vector $y_m$ and d'. $\Sigma_n$ is a unit matrix, and the frequency is $h_n=1000$. The other frequencies $h_i$ (i=1, 2, 3, 4, however, i≠n) are than decreased by 1. The learning step is terminated.

Learning step 3: The least distortion vector $y_m$ is changed in formula 5, and covariance $\Sigma_m$ in formula 6 (N=4). Other $y_i$ and $\Sigma_i$ (i=1, 2, 3, 4, however, i≠m) are left intact. In formulas 5 and 6, k denotes an input step, and γ is the learning coefficient, which is determined experimentally. The frequency $h_m$ is 1000. Other frequencies $h_i$ (i=1, 2, 3, 4, however, i≠m) are decreased by 1.

Learning step 4: If there is a representative vector $y_k$ of which frequency is 1 or more and covariance matrix formula is over threshold TΣ, and there is also a representative vector $y_n$ which frequency is less than zero, the splitting rules expressed in formulas 7 and 8 are applied.

The above process is done in the independent code book, covariance table, and frequency table for each block position of 22×18. The division rule of every 4 frames in the first embodiment is done after changing the representative vector in each frame in this embodiment. The frequency being less than zero means that it is not selected at all in the past 1000 frames, and the item of such representative vector is replaced with one dividing the other representative vector containing a larger error.

At step 2, if the square norm of the difference vector d is more than the threshold Td, same as in the prior art 1, the representative vector is immediately replaced with the input vector. As a result, when the scene is changed largely, the same effect as inter-frame prediction is obtained. In the first embodiment, the difference vector has been coded by the simple quantization of difference vector and Huffman coding. In this embodiment using DCT, a greater coding quantity can be assigned in the low range coefficient which is visually significant, and further efficient coding is realized. Moreover, the difference vector used in updating of the code book is decoded in a form preserving the visually significant low range coefficient in a better condition, and changing of the code book is expected to start from the more visually important components. In this embodiment, the code book is changed over in every block position, and the size of code book is 4 vectors at most. Therefore, although the input vector is 64-dimensional and is a relatively large order, the load of the process for searching the least distortion vector is not high, and it is suited to real time processing. According to this embodiment, it can be applied to prediction of the background in a television conference system or the like in which the camera does not move. If the background is changed over and the variety of background is less than the number of representative vectors in the code book, then the background can be transmitted by a small coding quantity.

In this embodiment, only vector quantization is used in generation of a predictive image, but as in the second prior art, it is also possible to extend the vector quantization coding/decoding apparatus by making use of a motion compensation image in generation of a predictive image. In this embodiment, the number of code books usable in the block position is limited to one, but, relating to position (i, j), for example, it is possible to use code books such as $C_{i,j-1}$, $C_{i,j+1}$, $C_{i-1,j}$, $C_{i+1,j}$ and the like aside from the code book $C_{i,j}$. In this case, the quality of the moving picture can be expected.

In the vector quantization coding apparatus and decoding apparatus in the second embodiment of the invention, the input vector is not limited to the blocks formed by dividing the image. For example, the luminance value of the sub-band or wavelet decomposition image may be used as input vector.

The third embodiment of the invention is described below while referring to FIGS. 3, 5 and 6. In this embodiment, a predictive image is generated by vector quantization and index data is sent, and the difference image of the predictive image and input image is sub-band coded, and transmitted and recorded. In reproduction, the difference image is added to the predictive image obtained from vector index data. At this time, vector quantization is composed of overlapped vectors.

Figure 3:
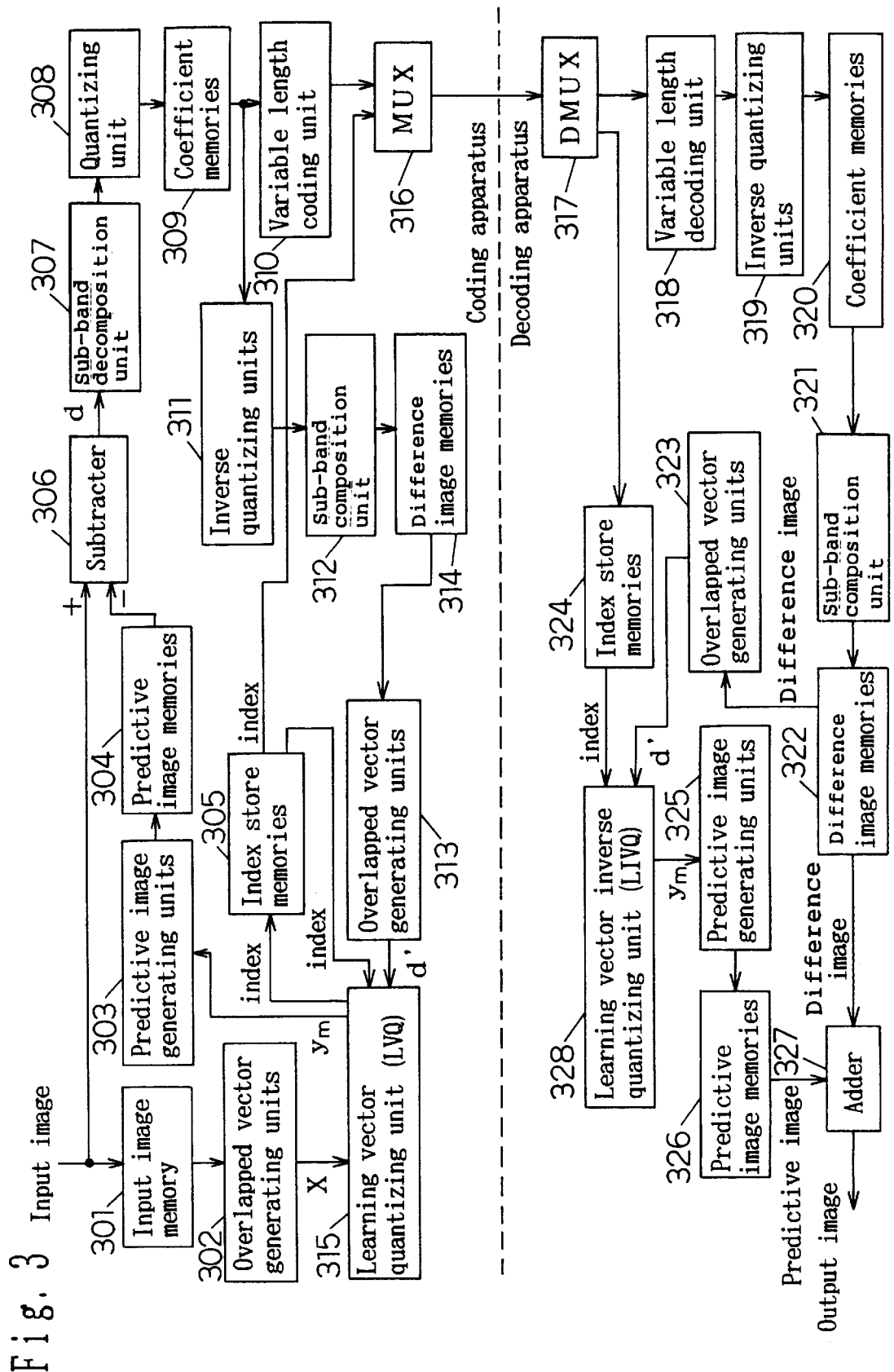
FIG. 3 is a block diagram of vector quantization coding apparatus and decoding apparatus in a third embodiment of the invention.

In FIG. 3, the composition of a learning vector quantizing unit 315 is nearly the same as LVQ (224) composed in the broken line area in FIG. 2 comprising the least distortion vector determining unit 201, code book 202, code book changeover unit 203, code book changing unit 205, frequency table 206, and covariance table 207. Also in FIG. 3, the composition of a learning inverse vector quantizing unit 328 is nearly the same as LIVQ (225) composed in the broken line area in FIG. 2 comprising code book changing unit 218, frequency table 219, covariance table 219, code book 221, and code book changeover unit 223. The only difference is that the input vector to be handled is not 64 dimensional of 8×8, but is 100-dimensional of overlapped 10×10. By contrast, the number of dimensions of the representative vector in the code book is 100 (k=100), and the covariance matrix in the covariance table is a square matrix of 100×100. Therefore, detailed description of the learning vector quantizing unit 315 and learning inverse vector quantizing unit 328 is omitted.

Figure 5:
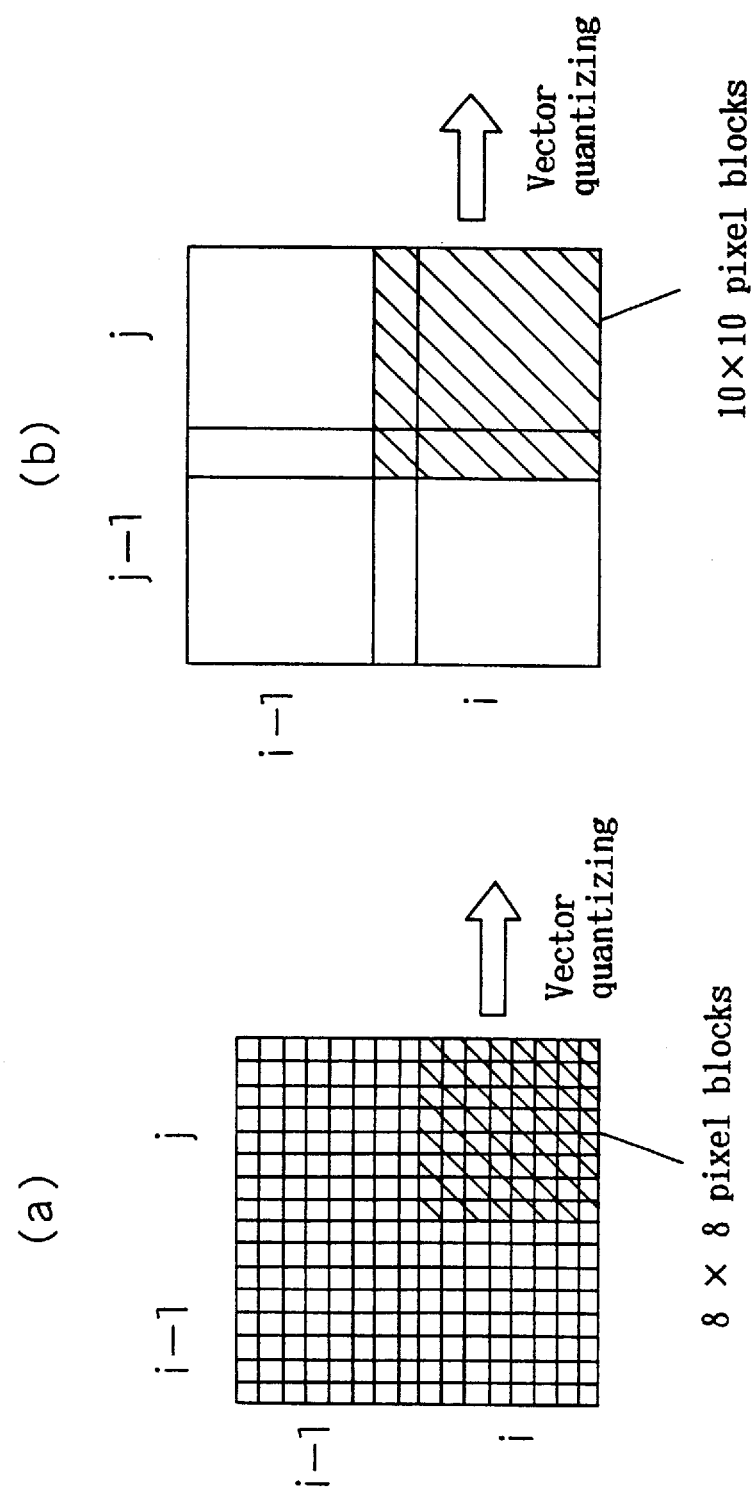
FIG. 5 (*a*) is a diagram showing an example of input vector composition in the second embodiment.

In the second embodiment, the input vector is composed of non-overlapping 8×8 blocks as shown in FIG. 5 (a), but in this embodiment, as shown in FIG. 5 (b), it is composed of 10×10 blocks disposed in intervals of 8 vertical and horizontal pixels while overlapping by 2 pixels each. The 100-dimensional input vector of 10×10 generates an overlap vector generating unit 302 from the input image memory 301. The representative vector ($y_m$ in FIG. 3) put into the learning vector quantizing unit 315 with least distortion is outputted together with the index data (index in FIG. 3). The index data is stored in the index store memory 305.

Figure 6:
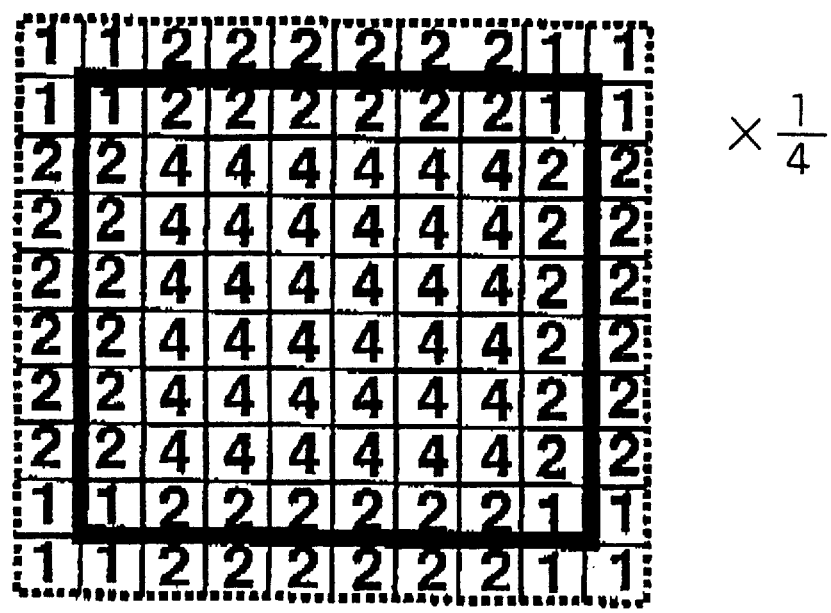
FIG. 6 is a diagram showing the coefficients for representative vector superposition in the third embodiment.
Figure 7:
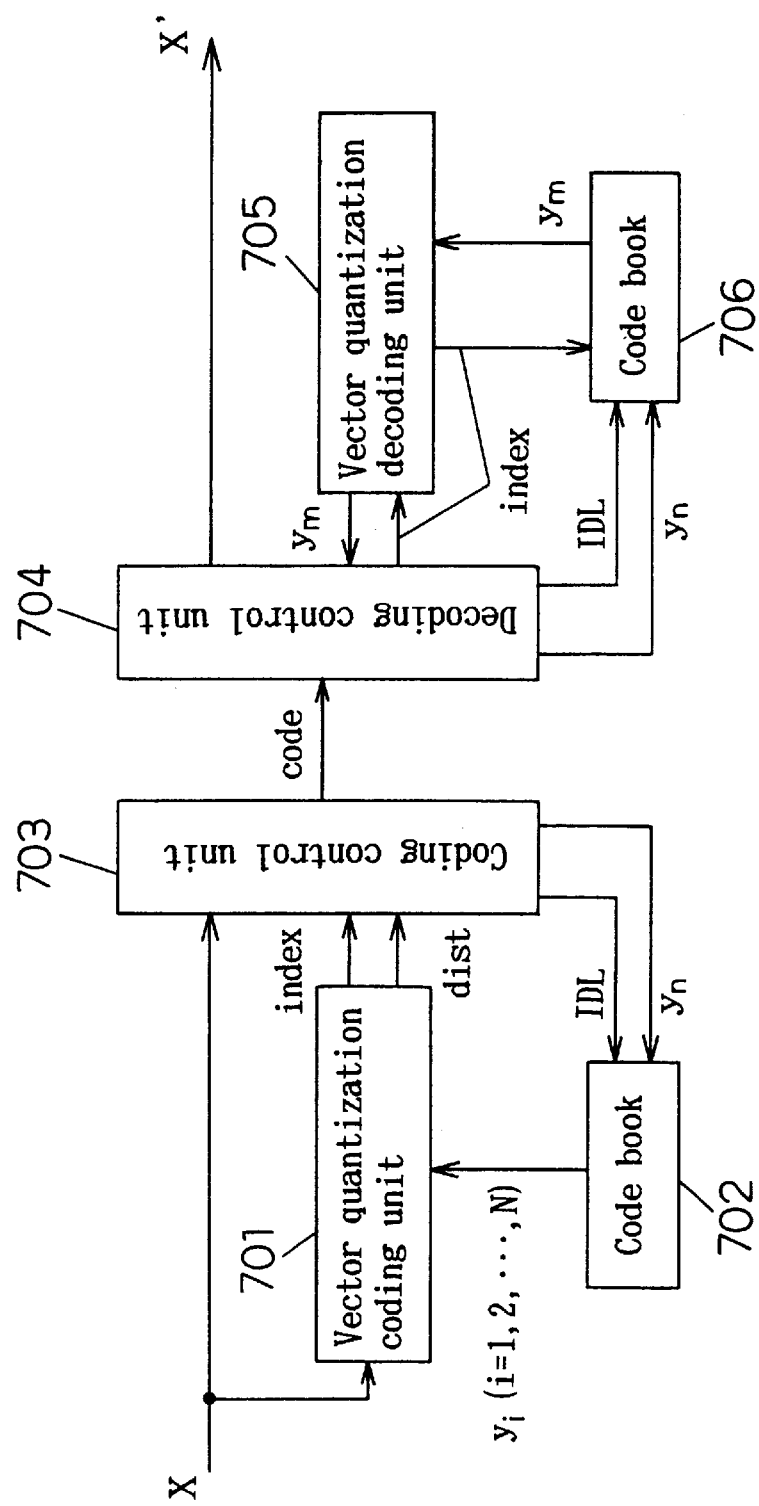
FIG. 7 is a structural diagram of a vector quantization coding apparatus and decoding apparatus in a first prior art.
Figure 8:
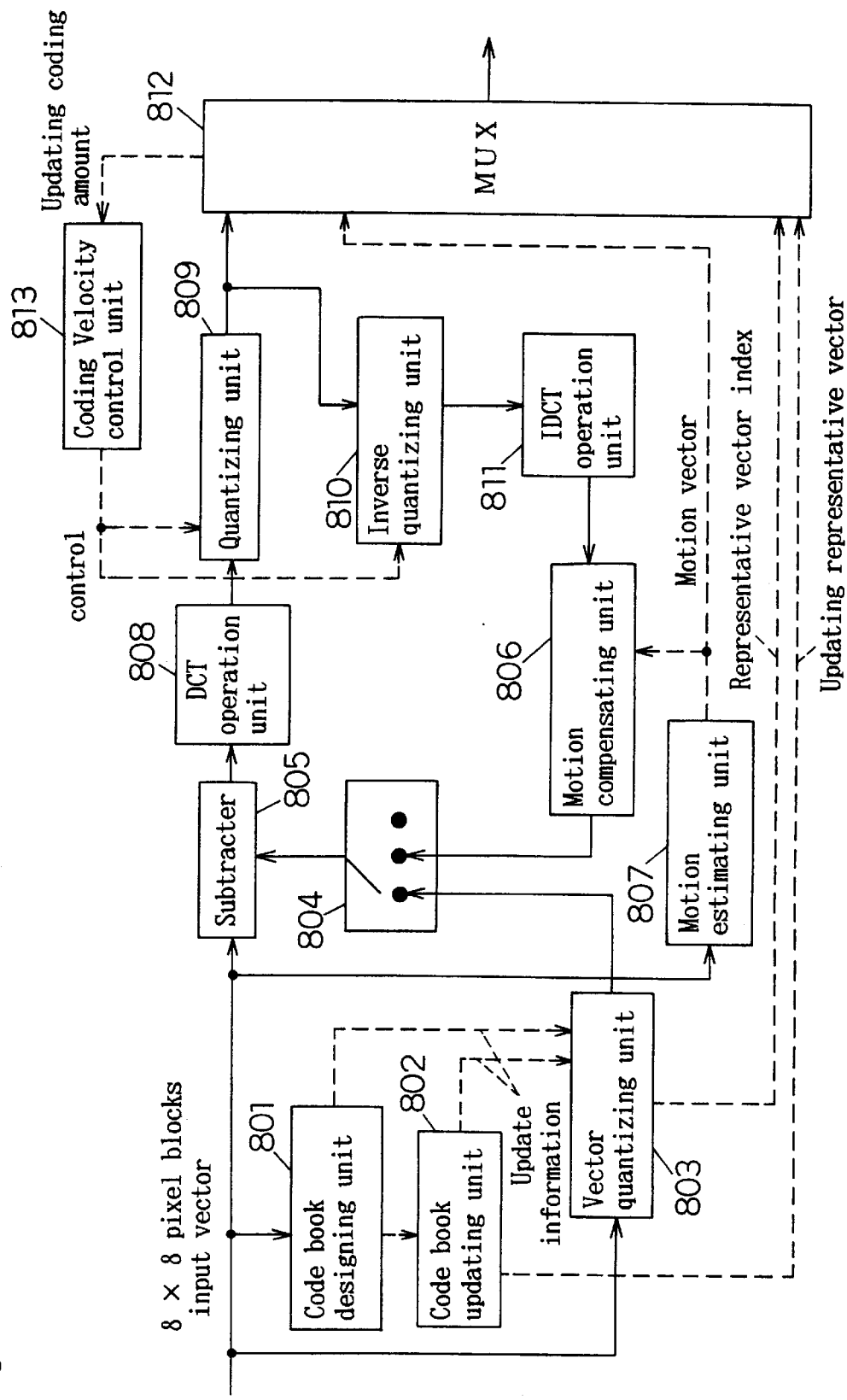
FIG. 8 is a structural diagram of a vector quantization coding apparatus and decoding apparatus in a second prior art.

A predictive image generating unit 303 multiplies the least distortion representative vector by the coefficient shown in FIG. 6, and writes into the block position of a predictive image memory 304. In the block boundary, at a rate proportional to the ratio of the coefficient, different pixel values are mixed. This process is done on the overlapped blocks of the entire screen, so that the index value of representative vector and predictive image at each block position are obtained.

A subtractor 306 determines the difference of the predictive image and input image. This difference image is put into a sub-band decomposition unit 307. In the sub-band decomposition and processing of sub-band composition units 312, 321, the processing disclosed by J. W. Woods and S. D. O'Neil is employed. The number of decompositions of the band is 64, same as in DCT. Therefore, at the same position in the image, 64 sub-band coefficients are obtained. They are handled the same as DCT coefficients in the second embodiment.

In the embodiment, processing of the quantizing unit 308, variable length coding unit 310, inverse quantizing units 311, 319, and variable length decoding unit 318 is the same as in the quantizing unit 209, variable length coding unit 210, inverse quantizing units 212, 216, and variable length coding 216 in the second embodiment.

In the image coding apparatus, to reproduce the difference vector sent into the image decoding apparatus, the difference image is reconstructed from the sub-band coefficients stored in the coefficient memory 309 through the inverse quantizing unit 311 and sub-band composition unit 312. Of course, passing through quantizing and inverse quantizing, it is not the same as the output of the subtractor 306. The overlap vector generating unit 313 cuts out a difference vector d' of 10×10 blocks from the difference image memory 314 as shown in FIG. 5 (b), and inputs it into the learning vector quantizing unit 315. Synchronizing with it, the index (index in FIG. 3) of the representative vector is read from the index store memory 305 into the learning vector quantizing unit 315, and thereby the code book is updated.

The image is transmitted and recorded through the multiplexer 316 and demultiplexer 317. The difference image is generated through the variable length decoding unit 318, inverse quantizing unit 319, coefficient memory 320, and sub-band composition unit 321, and is stored in the difference image memory 322. On the other hand, a learning inverse vector quantizing unit 328 sends out the corresponding representative vector ($y_m$ in FIG. 3) into the predictive image generating unit 325 from the code book in the learning inverse vector quantizing unit 328, on the basis of the index data of the representative vector stored in the index store memory 324. This processing is the same as in the predictive image generating unit 303 of the coding side. In the predictive image memory 326, the same image as in the predictive image memory 304 of the coding side is reproduced. An adder 327 calculates the sum of the predictive image and difference image, and reproduces an input image.

Updating of the decoding side code book is the same as at the coding side. An overlapped vector generating unit 323 cuts out a difference vector d' from the difference image memory 322. The learning inverse vector quantizing unit 328 updates the code book by using the difference vector and the index data from the index store memory 324.

In thus updated vector quantization coding apparatus and decoding apparatus, in addition to the effects obtained in the second embodiment, another effect obtained is that the block boundary is less visible. In this embodiment, the input vector is obtained by setting 10×10 overlapped blocks in the block position in the intervals of 8 vertical and horizontal pixels, but a larger block of 16×16 may be formed for the purpose of obtaining a further picture quality improvement. At this time, the operation for determining the least distortion vector may be constituted in a weighted least square distance multiplied with a coefficient which is larger in the block central area and smaller in the boundary, instead of the operation of the simple least square distortion.

According to these three embodiments, even in the situation of reappearance of background image and in the situation of changeover of plural image systems by a switch which caused to lower the picture quality in the conventional moving picture coding, a high coding efficiency can be obtained by recording the past input pattern by updating the code book, and by reproducing the pattern by vector quantization.

Thus, according to the first aspect of the invention, the vector quantization code book can be sequentially optimized while transmitting or recording the input pattern by a vector quantization index and a difference vector.

In the second aspect of the invention, by transmitting the image in the set of vector quantization index and difference vector, and using the code book by changing over depending on the position in the image, the number of representative vectors in the code book to be searched can be decreased, and the processing system of light processing load relative to the obtained picture quality can be built up.

In the third aspect of the invention, by vector quantization of the overlapped region, image coding with a less visible block boundary is realized.

According to the invention, therefore, by recording the pattern entered in the past, a high coding efficiency is obtained even in the situation of a reappearance of pattern after disappearance.

What is claimed is:

1. A vector quantization coding apparatus comprising:
   a code book for recording representative vectors,
   an input means for inputting a specific vector,
   an index data generating means for collating the input vector with the code book, selecting a representative vector with least distortion, and generating index data corresponding to the selected representative vector,
   a difference vector operating means for determining the difference vector between the selected representative vector and the input vector,
   a difference vector coding means for coding the difference vector,
   a changing means for, after the representative vector with minimum distortion is selected, changing the representative vector so that a norm of the difference vector may be smaller than the original norm of the difference vector, by using directly the difference vector when the difference vector coding is reversible processing or by using the difference vector after simulation of decoding processing when the difference vector coding is irreversible processing, a representative vector delete means for deleting the representative vector which is at a low-use frequency, a representative vector split means for splitting the representative vector which produces large distortion, and wherein the index data and the coded difference vector are outputted.

2. A vector Quantization decoding apparatus comprising:

an input means for inputting index data and a coded difference vector outputted from a vector quantization coding apparatus a code book of the same contents as a code book of the vector quantization coding apparatus, a decoding means for decoding the coded difference vector, a reading means for reading out a representative vector corresponding to the index data by referring to the code book, a changing means for, after the representative vector is read out, changing the representative vector so that a norm of the difference vector may be smaller than the original norm of the difference vector, by using directly the difference vector when the difference vector coding is reversible processing or by using the decoded difference vector when the difference vector coding is irreversible processing, a representative vector delete means for deleting the representative vector which is at a low-use frequency, a representative vector split means for splitting the representative vector which produces large distortion, and wherein a sum of the decoded difference vector and the read-out representative vector is outputted as an output vector.

3. A vector quantization coding apparatus comprising:

an input means for inputting a vector composed of luminance information existing in an adjacent area in an image, a plurality of code books for recording representative vectors, and corresponding to each position in the image, a selecting means for selecting at least one of the code books corresponding to the position in the image of the input vectors from the plurality of code books, an index data generating means for selecting a representative vector with least distortion by collating the input vector with the selected code book, and generating index data corresponding to the selected representative vector, a difference vector operating means for determining the difference vector between the selected representative vector and the input vector, and a difference vector coding means for coding the difference vector with an irreversible frequency transform which preserves perceptually significant lower range components in a frequency domain, wherein the index data and the coded difference vector are outputted.

4. A vector quantization decoding apparatus comprising:

an input means for inputting an index data and a coded difference vector from a vector quantization coding apparatus, a plurality of code books having the same content as a plurality of code books of the vector quantization coding apparatus, a selecting means for selecting at least one of said plurality of code books of the vector quantization decoding apparatus corresponding to the position in the image of the input data from the plurality of code books, a decoding means for decoding the coded difference vector which is irreversible coded by a frequency transform, and a reading means for reading out the representative vector corresponding to the index data by referring to the selected code book, wherein the sum of the decoded difference vector and the read-out representative vector is outputted as an output vector.

5. A vector quantization coding apparatus according to claim 1, wherein said representative vector split means bases a decision on covariance analysis.

6. A vector quantization decoding apparatus according to claim 2, wherein said representative vector split means bases a decision on convariance analysis.

7. A vector quantization coding apparatus comprising:

a code book for recording representative vectors, an input means for inputting a specific vector, an index data generating means for collating the input vector with the code book, selecting a representative vector with least distortion, and generating index data corresponding to the selected representative vector, a difference vector operating means for determining the difference vector between the selected representative vector and the input vector, a difference vector coding means for coding the difference vector with an irreversible frequency transform which preserves perceptually significant lower range components in a frequency domain, and a changing means for, after the representative vector with minimum distortion is selected, changing the representative vector so that a norm of the difference vector may be smaller than the original norm of the difference vector, wherein the index data and the coded difference vector are outputted.

8. A vector quantization decoding apparatus comprising:

an input means for inputting an index data and the coded difference vector outputted from a vector quantization coding apparatus, a code book of the same contents as in the code book of the vector quantization coding apparatus, a decoding means for decoding the coded difference vector which is irreversible coded by a frequency transform, a reading means for reading out a representative vector corresponding to the index data by referring to the code book of the vector quantization decoding apparatus, and a changing means for, after the representative vector is read out, changing the representative vector so that a norm of the difference vector may be smaller than the original norm of the difference vector, by using directly the difference vector when the difference vector coding is reversible processing or by using the decoded difference vector when the difference vector coding is irreversible processing, wherein a sum of the decoded difference vector and the read-out representative vector is outputted as an output vector.

9. A vector quantization coding and decoding system comprising:

a vector quantization coding apparatus including:
- a first code book for recording representative vectors,
- a first input means for inputting a specific vector,
- an index data generating means for collating the input vector with the first code book, selecting a representative vector with least distortion, and generating index data corresponding to the selected representative vector,
- a difference vector operating means for determining the difference vector between the selected representative vector and the input vector,
- a difference vector coding means for coding the difference vector, and
- a changing means for, after the representative vector with minimum distortion is selected, changing the representative vector so that a norm of the difference vector may be smaller than the original norm of the difference vector, by using directly the difference vector when the difference vector coding is reversible processing or by using the difference vector after simulating a decoding process to be done in a vector quantization decoding apparatus when the difference vector coding is irreversible processing,
- a representative vector delete means for deleting the representative vector which is at a low-use frequency, and
- a representative vector split means for splitting the representative vector which produces large distortion,
- wherein the index data and the coded difference vector are outputted from said vector quantization coding apparatus; and the vector quantization decoding apparatus including:
- a second input means for inputting the index data outputted from the vector quantization coding apparatus,
- a second code book having the same contents as the first code book of the vector quantization coding apparatus,
- a decoding means for decoding the coded difference vector,
- a reading means for reading out the representative vector corresponding to the index data by referring to the second code book, and
- a second changing means for, after the representative vector is read out, changing the representative vector so that a norm of the difference vector may be smaller than the original norm of the difference vector, by using directly the difference vector when the difference vector coding is reversible processing or by using the decoded difference vector when the difference vector coding is irreversible processing,
- a representative vector delete means for deleting the representative vector which is low at use-frequency, and
- a representative vector split means for splitting the representative vector which produces large distortions,
- wherein a sum of the decoded difference vector and the read-out representative vector is outputted as an output vector.

10. A vector quantization coding and decoding system according to claim 9, wherein
- said representative vector split means of said vector quantization coding apparatus bases a decision on convariance analysis, and
- said representative vector split means of said vector quantization decoding apparatus bases a decision on covariance analysis.

11. A vector quantization coding and decoding system comprising:

a vector quantization coding apparatus including:
- a first code book for recording representative vectors,
- a first input means for inputting a specific vector,
- an index data generating means for collating the input vector with the code book, selecting a representative vector with least distortion, and generating index data corresponding to the selected representative vector,
- a difference vector operating means for determining the difference vector between the selected representative vector and the input vector,
- a difference vector coding means for coding the difference vector with an irreversible frequency transform which preserves perceptually significant lower range components in a frequency domain, and
- a changing means for, after the representative vector with minimum distortion is selected, changing the representative vector so that a norm of the difference vector may be smaller than the original norm of the difference vector,
- wherein the index data and the coded difference vector are outputted from the vector quantization coding apparatus;

a vector quantization decoding apparatus including:
- a second input means for inputting the index data and the coded difference vector outputted from the vector quantization coding aparatus,
- a second code book having the same contents as the first code book of the vector quantization coding apparatus,
- a decoding means for decoding the coded difference vector which is irreversible coded by said frequency transform,
- a reading means for reading out the representative vector corresponding to the index data by referring to the second code book, and
- a second changing means for, after the representative vector is read out, changing the representative vector so that a norm of the difference vector may be smaller than the original norm of the difference vector, by using directly the difference vector when the difference vector coding is reversible processing or by using the decoded difference vector when the difference vector coding is irreversible processing,
- wherein a sum of the decoded difference vector and the read-out representative vector is outputted as an output vector.

* * * * *